United States Patent
Koga

(10) Patent No.: US 10,261,497 B2
(45) Date of Patent: Apr. 16, 2019

(54) MACHINE TOOL FOR GENERATING OPTIMUM ACCELERATION/DECELERATION

(71) Applicant: FANUC Corporation, Yamanashi (JP)

(72) Inventor: Daijirou Koga, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 270 days.

(21) Appl. No.: 15/268,665

(22) Filed: Sep. 19, 2016

(65) Prior Publication Data

US 2017/0090459 A1 Mar. 30, 2017

(30) Foreign Application Priority Data

Sep. 28, 2015 (JP) ................................. 2015-189542

(51) Int. Cl.
| | |
|---|---|
| G05B 19/408 | (2006.01) |
| G05B 19/402 | (2006.01) |
| G05B 13/02 | (2006.01) |
| G05B 19/416 | (2006.01) |
| G06N 99/00 | (2019.01) |

(52) U.S. Cl.
CPC ..... *G05B 19/4083* (2013.01); *G05B 13/0265* (2013.01); *G05B 19/402* (2013.01); *G05B 19/4163* (2013.01); *G06N 99/005* (2013.01); G05B 2219/33056 (2013.01); G05B 2219/39295 (2013.01); G05B 2219/41367 (2013.01); G05B 2219/49061 (2013.01)

(58) Field of Classification Search
CPC ............................ G05B 19/408; G05B 19/402
USPC .............................. 318/568; 700/253; 706/12
See application file for complete search history.

(56) References Cited

U.S. PATENT DOCUMENTS

| | | | |
|---|---|---|---|
| 2002/0195983 A1 | 12/2002 | Iwashita et al. | |
| 2004/0135536 A1* | 7/2004 | Iwashita | G05B 19/39 318/652 |

(Continued)

FOREIGN PATENT DOCUMENTS

| | | |
|---|---|---|
| JP | 4-135209 A | 5/1992 |
| JP | 6-35525 A | 2/1994 |

(Continued)

OTHER PUBLICATIONS

Office Action in JP Application No. 2015-189542, dated Jan. 31, 2017.

*Primary Examiner* — Sheng-Bai Zhu
(74) *Attorney, Agent, or Firm* — Hauptman Ham, LLP

(57) ABSTRACT

A machine tool includes an operation evaluation section that evaluates an operation thereof and a machine learning device that performs the machine learning of a movement amount of an axis thereof. The machine learning device calculates a reward based on state data including the output of the operation evaluation section, performs the machine learning of the determination of the movement amount of the axis, and determines the movement amount of the axis based on a machine learning result and outputs the determined movement amount. The machine learning device performs the machine learning of the determination of the movement amount of the axis based on the determined movement amount of the axis, the acquired state data, and the calculated reward.

6 Claims, 8 Drawing Sheets

(56) References Cited

U.S. PATENT DOCUMENTS

| | | | |
|---|---|---|---|
| 2006/0082340 A1* | 4/2006 | Watanabe | B25J 9/163 318/568.21 |
| 2006/0132078 A1 | 6/2006 | Iwashita et al. | |
| 2008/0218116 A1* | 9/2008 | Maeda | G05B 19/19 318/571 |
| 2011/0208356 A1 | 8/2011 | Kato et al. | |

FOREIGN PATENT DOCUMENTS

| | | |
|---|---|---|
| JP | 7-244517 A | 9/1995 |
| JP | 2003058218 A | 2/2003 |
| JP | 2006043836 A | 2/2006 |
| JP | 2006-172149 A | 6/2006 |
| JP | 2011-167817 A | 9/2011 |

\* cited by examiner

EXAMPLE OF ADJUSTMENT OF ACCELERATION/DECELERATION IN LATHE-TURNING

EXAMPLE OF ADJUSTMENT OF ACCELERATION/DECELERATION IN BORING MACHINING

TRAVELING DIRECTION OF TOOL : $(\delta x_{t-1}, \delta z_{t-1})$

DEVIATION AMOUNT FROM TOOL PATH : $d$

CURRENT SPEED OF EACH AXIS : $(\delta x_{t-1}, \delta z_{t-1})$

CURRENT ACCELERATION OF EACH AXIS : $(\delta x_{t-1} - \delta x_{t-2}, \delta z_{t-1} - \delta z_{t-2})$

COMMAND PATH IN LATHE-TURNING

COMMAND PATH IN BORING MACHINING

MACHINE TOOL FOR GENERATING OPTIMUM ACCELERATION/DECELERATION

RELATED APPLICATIONS

The present application claims priority to Japanese Patent Application Number 2015-189542, filed Sep. 28, 2015, the disclosure of which is hereby incorporated by reference herein in its entirety.

BACKGROUND OF THE INVENTION

1. Field of the Invention

The present invention relates to a machine tool and, in particular, to a machine tool that generates an optimum acceleration/deceleration in controlling each axis.

2. Description of the Related Art

In conventional machining of a component, a mold, or the like, a machining program is generated and a machine tool is controlled based on the generated machining program to perform the machining. A machining speed for performing machining is commanded as a movement speed of an axis in a machining program, which is a maximum speed of the relative movement (tool movement) between a tool and a machining object. However, actually, movement data in which a movement speed of each axis is varied according to an acceleration/deceleration time constant of each axis is output to a machine tool at the time of starting machining, or in a corner part, a curve part, or the like. Further, although a machining object has an allowable error and a target machining time, an operator of a machine tool adjusts, while confirming the machining surface quality of the machining object, the allowable error and the target machining time by changing an acceleration/deceleration time constant or changing a speed commanded in a program. Note that in the specification, machining accuracy indicating an error in the shape of an actual machining object with respect to a command position, i.e., the degree to which the shape of the machining object changes smoothly (a scratch or a streak is inconspicuous) is called machining surface quality.

As a related art associated with the adjustment of parameters such as an acceleration/deceleration time constant and a speed in such machining, Japanese Patent Application Laid-open No. 2003-058218 discloses a parameters adjustment method in which a plurality of types of parameters adjustable in machining is prepared and used as a parameter set. Further, Japanese Patent Application Laid-open No. 2006-043836 discloses a machining conditions setting method in which the generation of machining path information and the setting of machining conditions for reducing a machining time in consideration of machining accuracy are performed using a machining pattern.

In general, an increase in machining surface quality at a corner part or a curve part may be realized in such a way that an acceleration/deceleration for controlling a tool in performing machining is entirely decreased, but an entire machining speed is decreased. On the other hand, an acceleration/deceleration may be set to be entirely large to increase a machining speed. However, when a tool is rapidly decelerated and accelerated at a corner part or near a curve part under such a setting, there is a likelihood that vibration occurs in a machine to degrade machining surface quality (a machining surface is scratched).

FIGS. 8A and 8B are diagrams each showing an example in which an acceleration/deceleration suddenly occurs at a corner part of a tool path commanded by a machining program.

When a speed of a tool suddenly changes in various machining such as lathe-turning shown in FIG. 8A and boring machining shown in FIG. 8B, vibration occurs in a machine due to the impact of the change, which causes the degradation of machining surface quality at a corner part or a curve part. When adjusting an acceleration/deceleration while balancing an improvement in machining surface quality and reduction in a machining time in consideration of each element associated with the movement of an axis so as to prevent such phenomena, an operator has to expend much effort and may still not be able to optimize a speed or an acceleration.

As a response to such problems, the prior art techniques disclosed in Japanese Patent Application Laid-open No. 2003-058218 and Japanese Patent Application Laid-open No. 2006-043836 can only deal with situations adapted to a prepared parameter set or a machining pattern, and cannot flexibly deal with a diversity of situations.

SUMMARY OF THE INVENTION

In view of the above circumstances, the present invention has an object of providing a machine tool that generates an optimum acceleration/deceleration in controlling each axis.

In the present invention, a change amount from a position of an axis of a machine tool at a certain time to a position of the axis at the next moment is obtained. Such a change amount is data called a command pulse output from a numerical controller. Conventionally, an optimum change amount may not be obtained since an engineer of a machine tool manufacturer sets an acceleration/deceleration time constant of each axis to perform adjustment. Therefore, a movement amount of an axis is optimized to realize the movement of a tool having a smaller change in an acceleration without greatly changing a time for each machining, whereby high-quality machining is realized.

According to an embodiment of the present invention, a machine tool drives at least one axis based on a command path of a tool commanded by a program to perform machining of a workpiece. The machine tool includes: an operation evaluation section that evaluates an operation of the machine tool to output evaluation data; and a machine learning device that performs machine learning of a determination of a movement amount of the axis. The machine learning device has a state observation section that acquires, as state data, data including at least an axis position of the axis of the machine tool and the evaluation data output from the operation evaluation section, a reward conditions setting section that sets a reward condition, a reward calculation section that calculates a reward based on the state data acquired by the state observation section, a movement-amount adjustment learning section that performs the machine learning of the determination of the movement amount of the axis, and a movement-amount output section that determines the movement amount of the axis such that an acceleration of the tool becomes optimum, based on a machine learning result of the determination of the movement amount of the axis of the movement-amount adjustment learning section and the state data, and outputs the determined movement amount. The movement-amount adjustment learning section is configured to perform the machine learning of the determination of the movement amount of the axis based on the determined movement amount of the axis, the state data acquired by the state observation section after an operation of the machine tool based on the output movement amount of the axis, and the reward calculated by the reward calculation section.

The reward calculation section may calculate a positive reward when a combined speed of the axis is increased and calculate a negative reward when the tool deviates from the command path, when a change in an N-th order time differential element (where N is any natural number) of a speed of the tool is great, and when an impact occurs to the machine tool.

The machine tool may be connected to at least one another machine tool and mutually exchange or share the machine learning result with the other machine tool.

The movement-amount adjustment learning section may be configured to perform the machine learning, such that the reward be maximum, using the adjusted movement amount of the axis and an evaluation function in which the state data acquired by the state observation section is expressed by an argument.

According to another embodiment of the present invention, a simulation apparatus simulates a machine tool that drives at least one axis based on a command path of a tool commanded by a program to perform machining of a workpiece. The simulation apparatus includes: an operation evaluation section that evaluates a simulation operation of the machine tool to output evaluation data; and a machine learning device that performs machine learning of a determination of a movement amount of the axis. The machine learning device has a state observation section that acquires, as state data, simulated data including at least an axis position of the axis of the machine tool and the evaluation data output from the operation evaluation section, a reward calculation section that calculates a reward based on the state data acquired by the state observation section, a movement-amount adjustment learning section that performs the machine learning of the determination of the movement amount of the axis, and a movement-amount output section that determines the movement amount of the axis such that an acceleration of the tool becomes optimum, based on a machine learning result of the determination of the movement amount of the axis of the movement-amount adjustment learning section and the state data, and outputs the determined movement amount. The movement-amount adjustment learning section is configured to perform the machine learning of the determination of the movement amount of the axis based on the determined movement amount of the axis, the state data acquired by the state observation section after the simulation operation of the machine tool based on the output movement amount of the axis, and the reward calculated by the reward calculation section.

According to still another embodiment of the present invention, a machine learning device has performed machine learning of an adjustment of a movement amount of at least one axis of a machine tool. The machine learning device includes: a learning result storage section that stores a machine learning result of a determination of the movement amount of the axis; a state observation section that acquires state data including at least an axis position of the axis of the machine tool; and a movement-amount output section that determines the movement amount of the axis such that an acceleration of a tool of the machine tool becomes optimum, based on the machine learning result stored in the learning result storage section and the state data, and outputs the determined movement amount.

According to embodiments of the present invention, it becomes possible to control each axis at an optimum acceleration/deceleration and realize the machining of a workpiece maintaining machining surface quality in a shorter period of time by the introduction of machine learning into the determination of an optimum movement amount of each axis.

BRIEF DESCRIPTION OF THE DRAWINGS

The above and other objects and features of the present invention will become apparent from the descriptions of the following embodiments with reference to the accompanying drawings in which.

DETAILED DESCRIPTION OF THE PREFERRED EMBODIMENTS

Figure 1A:
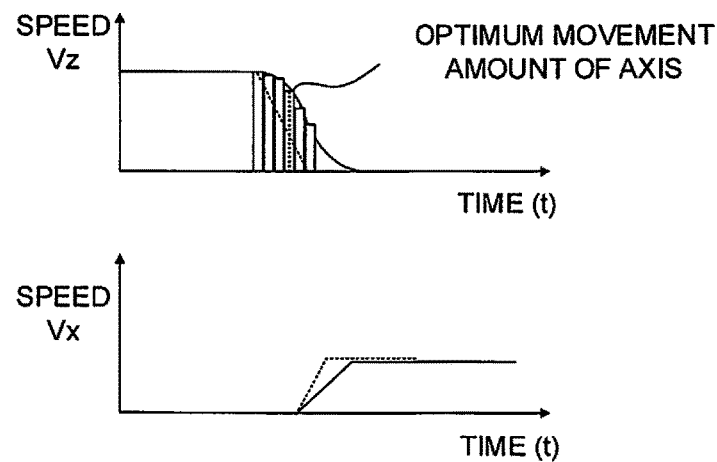
FIGS. 1A and 1B are diagrams for describing an example in which an acceleration/deceleration of each axis is optimized in the machining of a workpiece by the introduction of a machine learning device into a machine tool according to the present invention.
Figure 1B:
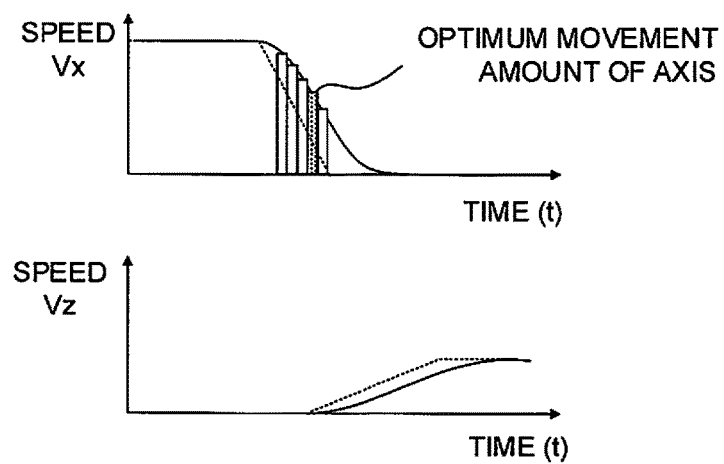

In the present invention, a machine learning device acting as artificial intelligence is introduced into a machine tool that machines a workpiece, and machine learning is performed about the determination of a movement amount to adjust an acceleration/deceleration of each axis of the machine tool in the machining of the workpiece based on a machining program, whereby the acceleration/deceleration (a change in a movement amount) of each axis of the machine tool is adjusted to be optimum at each time in the machining of the workpiece as shown in FIGS. 1A and 1B. In the adjustment of the acceleration/deceleration of each axis, the faster movement of a tool, the avoidance of the deviation of a tool path, and the avoidance of the occurrence of an impact are targeted. Thus, the machining of a workpiece maintaining its machining surface quality is realized in a shorter period of time.

Hereinafter, a description will be briefly given of machine learning to be introduced into a machine tool according to the present invention.

(1) Machine Learning

In general, machine learning is classified into various algorithms such as supervised learning and unsupervised learning according to its target or conditions. The present invention has an object of learning the determination of a movement amount to adjust an acceleration/deceleration of each axis of a machine tool in the machining of a workpiece based on a machining program. In consideration of the fact that it is hard to explicitly indicate what type of action (adjustment of a movement amount of each axis) may be appropriately performed with respect to a movement path of a tool based on an output movement amount of each axis, a reinforcement learning algorithm in which a machine learning device automatically learns an action for achieving an object only with the acceptance of a reward is employed.

Figure 2:
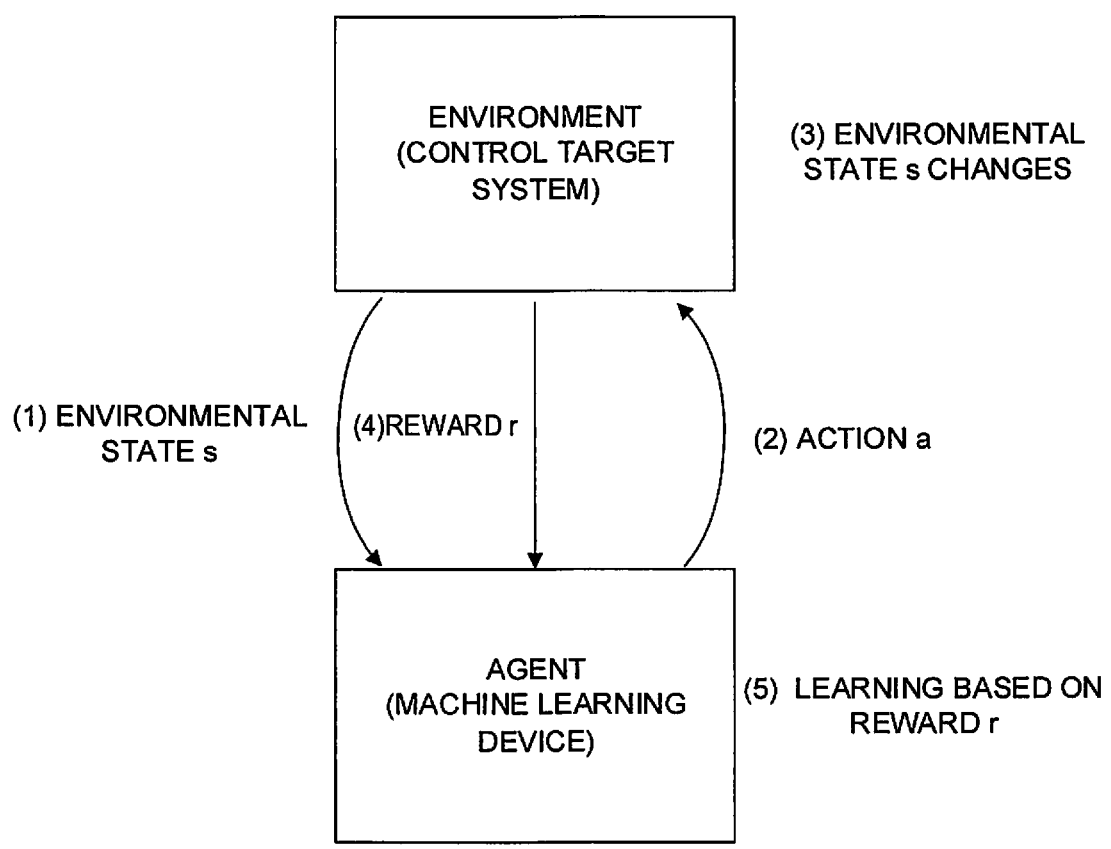
FIG. 2 is a diagram for describing the basic concept of a reinforcement learning algorithm.

FIG. 2 is a diagram for describing the basic concept of a reinforcement learning algorithm.

In reinforcement learning, agent learning and an action are advanced by the interactions between an agent (machine learning device) acting as a learning subject and an environment (control target system) acting as a control target. More specifically, the following interactions are performed between the agent and the environment.

(1) The agent observes an environmental state $s_t$ at a certain time.

(2) The agent selects and performs an action $a_t$ that the agent is allowed to take based on an observation result and past learning.

(3) The environmental state $s_t$ changes to a next state $s_{t+1}$ after the action $a_t$ is performed.

(4) The agent accepts a reward $r_{t+1}$ based on the state change as a result of the action $a_t$.

(5) The agent advances the learning based on the state $s_t$, the action $a_t$, the reward $r_{t+1}$, and a past learning result.

In the learning of the above processing (5), the agent acquires the mapping of an observed state $s_t$, an action $a_t$, and a reward $r_{t+1}$ as reference information for determining an amount of a reward that the agent is allowed to obtain in the future. For example, when the number of states that the agent is allowed to have at each time is m and the number of actions that the agent is allowed to take is n, the agent obtains a two-dimensional arrangement of m×n, in which rewards $r_{t+1}$ corresponding to pairs of states $s_t$ and actions $a_t$ are stored, by repeatedly performing actions.

Then, with a value function (evaluation function) indicating to what degree a current state or action is valuable based on the above acquired mapping, the agent updates the value function (evaluation function) while repeatedly performing actions to learn an optimum action corresponding to a state.

A "state value function" is a value function indicating to what degree a certain state $s_t$ is valuable. The state value function is expressed as a function using a state as an argument and updated based on a reward obtained with respect to an action in a certain state, a value of a future state changed with the action, or the like in learning from repeated actions. The update formula of the state value function is defined according to a reinforcement learning algorithm. For example, in TD (Temporal-Difference) learning indicating as one of reinforcement learning algorithms, the state value function is defined by the following formula (1). Note that in the following formula (1), α is called a learning coefficient, γ is called a discount rate, and the learning coefficient and the discount rate are defined to fall within 0<α≤1 and 0<γ≤1, respectively.

$$V(s_t) \leftarrow V(s_t) + \alpha[r_{t+1} + \gamma V(s_{t+1}) - V(s_t)] \quad (1)$$

In addition, an "action value function" is a value function indicating to what degree an action $a_t$ is valuable in a certain state $s_t$. The action value function is expressed as a function using a state and an action as arguments and updated based on a reward obtained with respect to an action in a certain state, an action value of a future state changed with the action, or the like in learning from repeated actions. The update formula of the action value function is defined according to a reinforcement learning algorithm. For example, in Q-learning indicating as one of typical reinforcement learning algorithms, the action value function is defined by the following formula (2). Note that in the following formula (2), α is called a learning coefficient, γ is called a discount rate, and the learning coefficient and the discount rate are defined to fall within 0<α≤1 and 0<γ≤1, respectively.

$$Q(s_t, a_t) \leftarrow Q(s_t, a_t) + \alpha\left(r_{t+1} + \gamma \max_a Q(s_{t+1}, a) - Q(s_t, a_t)\right) \quad (2)$$

Note that as a method for storing a value function (evaluation function) as a learning result, a method using a supervised learning device such as a SVM (Support Vector Machine) and a neural network of a multiple-value output that output a value (evaluation) with a state $s_t$ and an action $a_t$ as inputs, for example, when the state s takes many states, or the like is available besides a method using an approximate function and a method using an arrangement.

Further, in the selection of an action in the above processing (2), an action $a_t$ by which a reward ($r_{t+1}+r_{t+2}+\ldots$) over a future becomes maximum in a current state $s_t$ (an action for changing to a most valuable state when a state value function is used or a most valuable action in the state when an action value function is used) is selected using a value function (evaluation function) generated by past learning. Note that during learning, an agent may select a random action with a constant probability for the purpose of advancing the learning in the selection of an action in the above processing (2) (ε-greedy method).

As described above, learning is advanced by repeatedly performing the above processing (1) to (5). Even in a new environment after the completion of learning in a certain environment, the learning may be advanced so as to be adapted to the new environment by additional learning.

Accordingly, as in the present invention, the learning is applied to the determination of a movement amount to adjust an acceleration/deceleration of each axis at each time in the machining of a workpiece based on a machining program. Thus, even when the learning is applied to the control of a new machine tool, a new machining program is additionally learned as a new environment based on the learning of the determination of a movement amount to adjust an acceleration/deceleration of each axis at each time in the past machining of a workpiece, whereby it becomes possible to perform the further learning of the determination of the movement amount to adjust the acceleration/deceleration of each axis at each time in a short period of time in the machining of the workpiece based on the machining program.

In addition, reinforcement learning employs a system in which a plurality of agents are connected to each other via a network or the like, and information on states s, actions a, rewards r, or the like is shared between the agents and applied to each learning, whereby each of the agents performs dispersed reinforcement learning in consideration of the environments of the other agents, thereby allowing to perform efficient learning. Also in the present invention, when a plurality of agents (machine learning devices) controlling a plurality of environments (machine tools acting as control targets) perform dispersed machine learning in a state of being connected to each other via a network or the like, the machine tools are allowed to efficiently learn the determination of a movement amount to adjust an acceleration/deceleration of each axis at each time in the machining of a workpiece based on a machining program.

Note that although various methods such as Q-learning, an SARSA method, TD learning, and an AC method have been commonly known as reinforcement learning algorithms, any of the above reinforcement algorithms may be applied to the present invention. Since each of the reinforcement learning algorithms has been commonly known, its detailed description will be omitted in the specification.

Hereinafter, a description will be given, based on a specific embodiment, of the machine tool of the present invention into which a machine learning device is introduced.

(2) Embodiment

Figure 3:
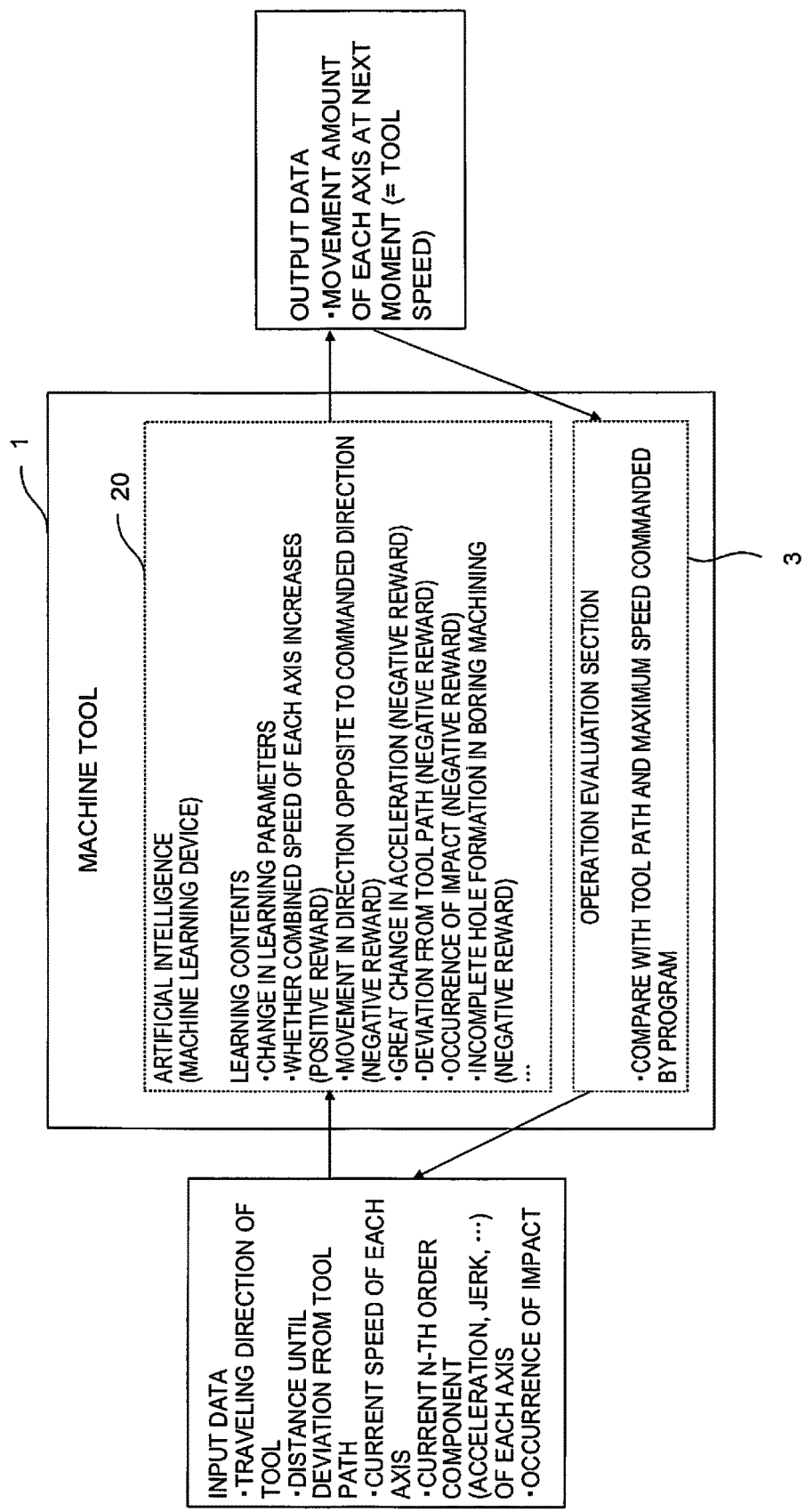
FIG. 3 is an image diagram regarding the machine learning of the machine tool according to an embodiment of the present invention.

FIG. 3 is a diagram showing an image regarding the machine learning of the determination of a movement amount to adjust an acceleration/deceleration of each axis at each time in a machine tool into which a machine learning device acting as artificial intelligence according to an embodiment of the present invention is introduced. Note that FIG. 3 shows only configurations necessary for describing the machine learning by the machine tool according to the embodiment.

In the embodiment, a traveling direction of a tool, a deviation amount from a tool path, a current speed of each axis, an N-th order time differential element (an acceleration, a jerk, . . . ,) of a current speed of each axis, the occurrence of an impact, or the like are input to the machine learning device 20 as information for causing the machine learning device 20 to specify an environment (a state $s_t$ in "(1) Machine Learning" described above). Each of these values includes data acquired from each section of the machine tool 1 and data calculated by an operation evaluation section 3 based on the acquired data.

Figure 4:
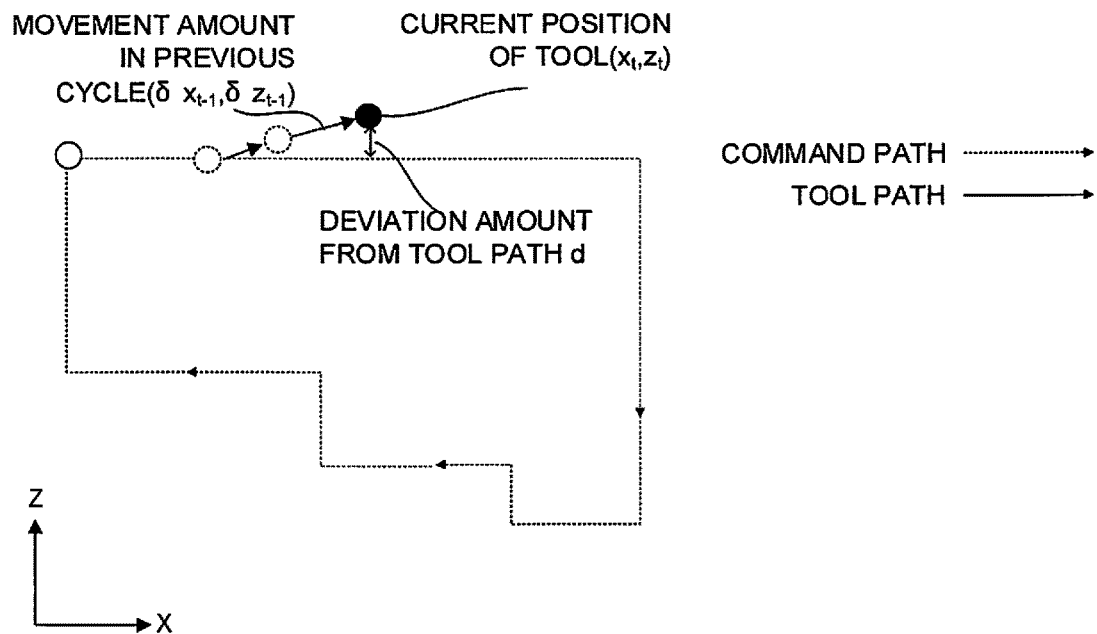
FIG. 4 is a diagram for describing each data regarding each axis of the machine tool in the embodiment.

FIG. 4 is a diagram for describing each data regarding a machine tool 1 according to the embodiment.

In the machine tool 1 according to the embodiment, a command path obtained by analyzing a machining program is stored in a memory (not shown). Besides an axis position $(x_t, z_t)$ of each axis, a movement speed $(\delta x_{t-1}, \delta z_{t-1})$ of each axis, and an acceleration $(\delta x_{t-1} - \delta x_{t-2}, \delta z_{t-1} - \delta z_{t-2})$ of each axis at time t obtained from the machine tool 1, the input data described above includes data calculated by the operation evaluation section 3 based on each of the data described above such as a distance d at which each axis position deviates from the command path.

Note that FIG. 4 shows an example of each input data in an X-Z two-dimensional coordinate system. However, when the machine tool has three or more axes, the number of the dimensions of input data may be appropriately increased to suit the number of the axes.

In the embodiment, the machine learning device 20 outputs a movement amount of each axis at a next moment (a current cycle in the control cycle of a control apparatus) as output data to an environment (an action $a_t$ in "(1) Machine Learning" described above). Note that in the embodiment, a movement amount of each axis output at a certain cycle is consumed (moved) without a delay within the cycle by a servo motor that drives each axis. Therefore, the movement amount (output at one control cycle) is handled as a movement speed of a tool as it is hereinafter.

In addition, in the embodiment, an increase in the combined speed of respective axes (positive reward), a movement in a direction opposite to a commanded direction (negative reward), a great change in an N-th order time differential element (where N is any natural number) of a speed of a tool (negative reward), a deviation from a tool path (negative reward), an excess of a maximum speed (negative reward), the occurrence of an impact (negative reward), or the like is employed as a reward (a reward $r_t$ in "(1) Machine Learning" described above) given to the machine learning device 20. The reward is calculated by the operation evaluation section 3 based on an achievement degree of each reward according to input data, output data, or the like. Note that an operator may appropriately set as to which data is used to determine the reward according to the machining contents of a machining program in the machine tool 1. For example, in boring machining, an incomplete formation of a hole may be defined as a negative reward.

Moreover, in the embodiment, the machine learning device 20 performs machine learning based on input data, output data, and a reward described above. In the machine learning, a state $s_t$ is defined by the combination of input data at certain time t, the output of a movement amount performed with respect to the defined state $s_t$ is equivalent to an action $a_t$, and a value evaluated and calculated based on input data newly obtained as a result of the output of the movement amount due to the action $a_t$ is equivalent to a reward $r_{t+1}$. As in "(1) Machine Learning" described above, the state $s_t$, the action $a_t$, and the reward $r_{t+1}$ are applied to the update formula of a value function (evaluation function) corresponding to a machine-learning algorithm to advance the learning.

Hereinafter, a description will be given, with reference to the function block diagram of FIG. 5, of the function of the machine tool 1 of the embodiment.

Figure 5:
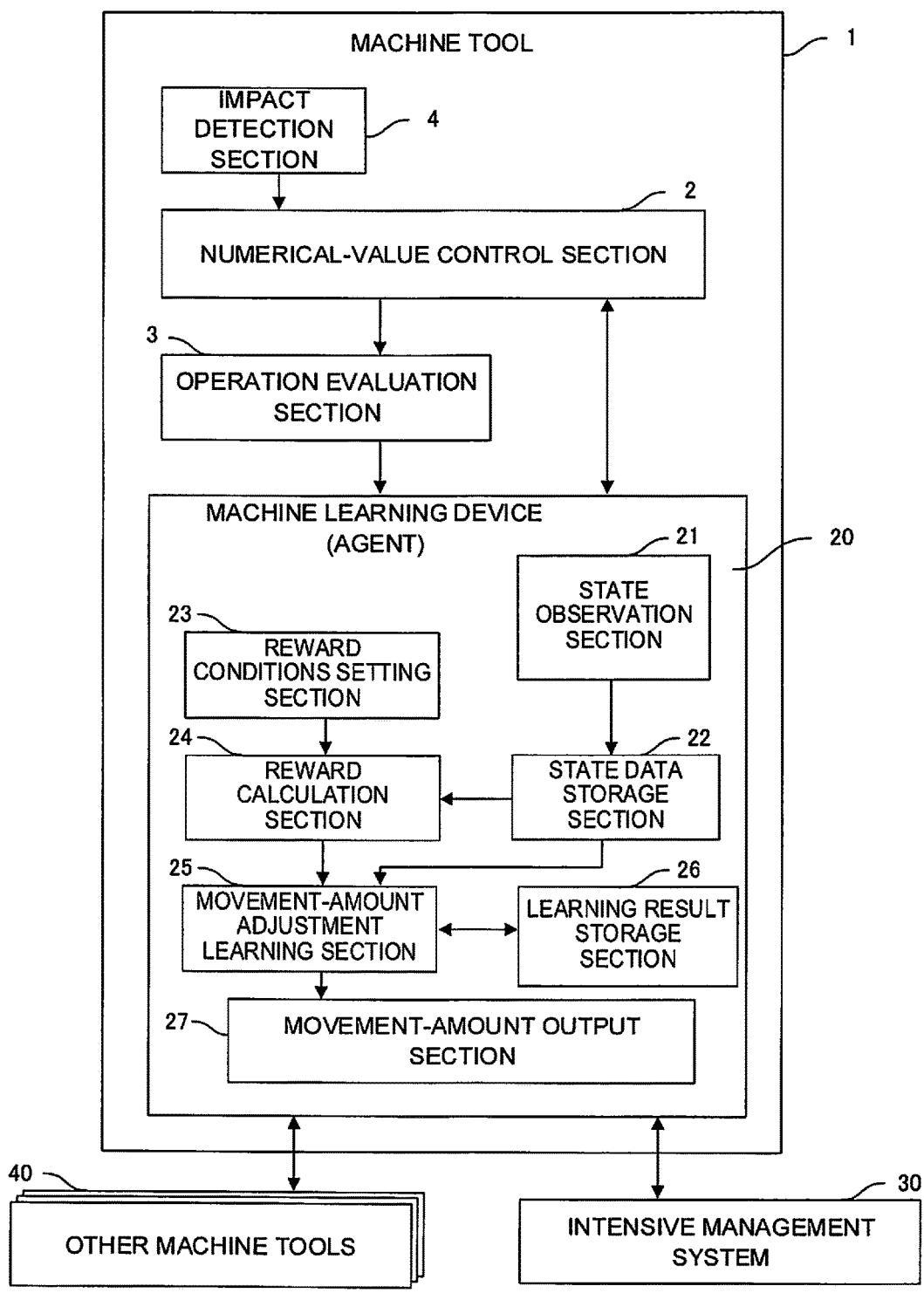
FIG. 5 is a function block diagram of the machine tool according to the embodiment of the present invention.

FIG. 5 is a function block diagram of the machine tool of the embodiment.

The machine tool 1 of the embodiment is provided with configurations and peripheral equipment (not shown) provided as standard in the machine tool such as a driving section (not shown), e.g. a servo motor, that drives each axis in the machining of a workpiece and a servo control section (not shown) that controls the servo motor, a numerical control section 2 that controls the driving section and the peripheral equipment, an operation evaluation section 3 that evaluates the operation of the machine tool based on the operation of the driving section or the peripheral equipment and each data acquired from the numerical control section 2, an impact detection section 4 constituted by an impact sensor or the like that detects an impact occurring to the machine tool, and a machine learning device 20 acting as artificial intelligence that performs machine learning.

When the configurations of the machine tool shown in the block diagram of FIG. 5 are compared with the elements of the reinforcement learning shown in FIG. 2, the machine learning device 20 of FIG. 5 corresponds to the "agent" of FIG. 2, and an entirety including the driving section, the peripheral equipment, the numerical control section 2, or the like provided in the machine tool 1 of FIG. 5 corresponds to the "environment" of FIG. 2. Note that the machine tool 1 is assumed to be provided with the configurations of general machine tools and detailed descriptions of configurations other than those especially necessary for describing the operation of the machine learning in the present invention will be omitted.

The numerical control section 2 analyzes a machining program read from a memory (not shown) or input via input equipment (not shown) or the like and controls each section of the machine tool 1 based on control data obtained as a result of the analysis. In general, the numerical control section 2 performs control based on an analysis result of the machining program. However, in the embodiment, the control of each axis that drives the tool of the machine tool 1 is performed according to a movement amount of each axis output from the machine learning device 20.

The operation evaluation section 3 evaluates a movement amount of each axis of the machine tool output from the machine learning device 20 at each control cycle based on a position of each axis of the machine tool 1 acquired from the numerical control section 2, a command path of a tool commanded by a machining program analyzed by the numerical control section 2, a feeding speed (maximum speed) of a tool commanded by the machining program, or the like, and then notifies the machine learning device 20 of an evaluation result. The evaluation of an action by the operation evaluation section 3 is used to calculate a reward in the learning of the machine learning device 20.

Examples of the evaluation of an action include the angle between a movement direction based on a movement amount of each axis of the machine tool 1 and a movement direction of a command path commanded by a machining program near a current position of a tool grasped by positions of respective axes of the machine tool 1, a deviation amount of a current position of a tool from a command path, and the difference between a movement speed based on movement amounts of respective axes and a maximum speed commanded by a machining program near a current position of a tool, and a magnitude of the absolute value of a jerk (a magnitude of a change in an acceleration). However, other than the abovementioned, an action may be evaluated in any way so long as the evaluation of the quality of the action output from the machine learning device 20 is made possible.

The machine learning device 20 that performs machine learning is provided with a state observation section 21, a state data storage section 22, a reward conditions setting section 23, a reward calculation section 24, a movement-amount adjustment learning section 25, a learning result storage section 26, and a movement-amount output section 27. The machine learning device 20 may be provided inside the machine tool 1 or may be provided in a personal computer or the like outside the machine tool 1.

The state observation section 21 observes each data regarding the machine tool 1 via the numerical control section 2 and acquires the observed data inside the machine learning device 20. In addition, the state observation section 21 acquires an evaluation result of an operation by the operation evaluation section 3 as state data inside the machine learning device 20. The state data acquired inside the machine learning device 20 includes, besides an axis position or a speed of each axis and an N-th order time differential element (an acceleration, a jerk, . . . ) of a speed of each axis described above, temperature, current, voltage, pressure, time, torque, force, consumption power, a calculation value calculated by performing the arithmetic machining of each physical amount, or the like.

In addition, the evaluation result of the operation by the operation evaluation section 3 includes the angle between a command path and a movement direction of a tool, a deviation degree from a range in which an allowable error is added to a tool path of a current position of a tool, the difference between a movement speed of a tool and a commanded maximum speed, a magnitude of the absolute value of a jerk (a magnitude of a change in an acceleration), or the like. Note that a magnitude of the absolute value of a jerk is used as a scale of a magnitude of an impact. Therefore, both a value of an impact detected by the impact detection section 4 and a magnitude of the absolute value of a jerk acquired from the operation evaluation section 3 are not necessarily required, but only one of them may be acquired as state data.

The state data storage section 22 receives and stores state data and outputs the stored state data to the reward calculation section 24 and the movement-amount adjustment learning section 25. The state data input to the state data storage section 22 may be data acquired by the latest processing operation or data acquired by a past processing operation. In addition, it is also possible for the state data storage section 22 to receive and store state data stored in another machine tool 40 or an intensive management system 30, or is possible for the state data storage section 22 to output state data stored in the state data storage section 22 to another machine tool 40 or the intensive management system 30.

The reward conditions setting section 23 sets conditions for giving rewards in machine learning set by an operator or the like. Positive and negative rewards are given and may be appropriately set. In addition, an input to the reward conditions setting section 23 may be performed via a personal computer, a tablet terminal, or the like used in the intensive management system. However, with an input via the MDI (Manual Data Input) device not shown of the machine tool 1, it becomes possible to easily set conditions for giving rewards.

The reward calculation section 24 analyzes state data input from the state observation section 21 or the state data storage section 22 based on conditions set by the reward conditions setting section 23, and outputs calculated rewards to the movement-amount adjustment learning section 25.

Hereinafter, a description will be given of an example of reward conditions set by the reward conditions setting section 23 in the embodiment.

(Reward 1: Increase in Combined Speed of Respective Axes (Positive Reward and Negative Reward))

Since the cycle time of machining increases when a combined speed of respective axes exceeds a past combined speed of respective axes, a positive reward is given according to an increasing degree of the speed.

On the other hand, since a failure or the like occurs in the machine tool 1 when a combined speed of respective axes exceeds a commanded maximum speed or when a speed of each axis exceeds a maximum speed of each axis set in the machine tool 1, a negative reward is given according to an excess degree of the speed.

(Reward 2: Movement in Direction Different from Commanded Direction)

In view of an angle formed between a movement direction of a tool based on a movement amount of each axis of the machine tool 1 and a movement direction of a command path commanded by a machining program near a current position of the tool grasped from a position of each axis of the machine tool 1, when the movement direction of the tool is greatly different from the command path commanded by the machining program, a negative reward is given according to a degree of the difference. As an example of a negative reward, when an angle formed between a movement direction of a tool and a movement direction of a command path is greater than a prescribed angle (for example, within ±45 degrees), a value obtained by multiplying the difference by a prescribed coefficient may be given as a negative reward. In addition, when the angle simply exceeds 180 degrees (in a direction opposite to the movement direction of the command path), a negative reward may be given.

(Reward 3: Great Change in N-Th Order Time Differential Element (where N is any Natural Number) of Speed of Tool (Negative Reward))

When a change in an N-th order time differential element (where N is any natural number, acceleration, jerk, or the like) of a speed of each axis of the machine tool 1 exceeds a prescribed value set in advance, a negative reward is given according to an excess degree of the change.

(Reward 4: Deviation of Tool Path)

When a current position of a tool deviates from a command path commanded by a machining program, a negative reward is given according to a degree of the deviation. That is, a deviation degree may be based on the distance amount between a current position of a tool and a command path to give a negative reward.

(Reward 5: Occurrence of Impact (Negative Reward))

When an impact exceeding a prescribed value set in advance is detected by the impact detection section 4 provided in the machine tool 1, a negative reward is given according to an excess degree of the impact.

The movement-amount adjustment learning section 25 performs machine learning (reinforcement learning) based on state data including input data or the like, an adjustment result of a movement amount of each axis of the machine tool 1 performed by itself, and a reward calculated by the reward calculation section 24.

Here, in the machine learning performed by the movement-amount adjustment learning section 25, a state $s_t$ is defined by the combination of state data at certain time t, and the determination of a movement amount of each axis according to the defined state $s_t$ is equivalent to an action $a_t$, a movement amount of each axis determined by the movement-amount output section 27 that will be described later is output to the numerical control section 2, and a value calculated by the reward calculation section 24 based on data obtained when each axis of the machine tool 1 is moved based on the determined movement amount of each axis by the numerical control section 2 is equivalent to a reward $r_{t+1}$. A value function used in the learning is determined according to an applied learning algorithm. For example, when Q-learning is used, it is only necessary to update an action value function $Q(s_t, a_t)$ according to the above formula (2) to advance the learning.

Figure 6:
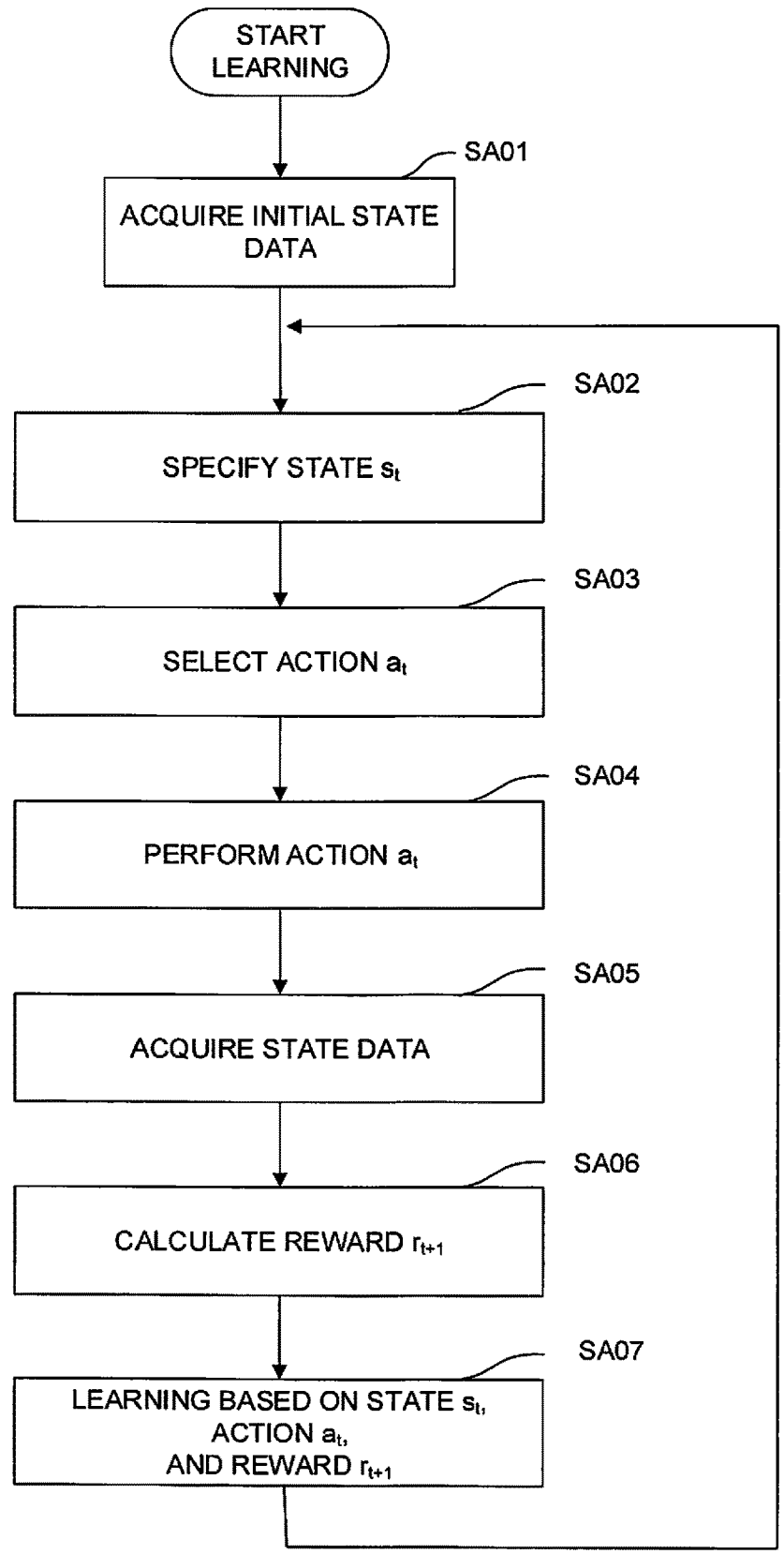
FIG. 6 is a flowchart for describing the flow of the machine learning performed by the machine learning device of FIG. 5.

A description will be given, with reference to the flow-chart of FIG. 6, of the flow of machine learning performed by the movement-amount adjustment learning section 25 of the machine learning device 20 of FIG. 5. Hereinafter, the processing is explained below according to respective steps.

(Step SA01) When machine learning starts, the state observation section 21 acquires data regarding a working state of the machine tool 1.

(Step SA02) The movement-amount adjustment learning section 25 specifies a current state $S_t$ based on the data regarding the working state acquired by the state observation section 21.

(Step SA03) The movement-amount adjustment learning section 25 selects an action $a_t$ (determination of a movement amount of each axis) based on a past learning result and the state $S_t$ specified in step SA02.

(Step SA04) The action $a_t$ selected in step SA03 is performed.

(Step SA05) The state observation section 21 acquires data regarding a machining state showing a state of the machine tool 1. At this stage, the state of the machine tool 1 changes with a temporal transition from time t to time t+1 as a result of the action $a_t$ performed in step SA04.

(Step SA06) The reward calculation section 24 calculates a reward $r_{t+1}$ based on the data on the evaluation result acquired in step SA05.

(Step SA07) The movement-amount adjustment learning section 25 advances the machine learning based on the state $S_t$ specified in step SA02, the action $a_t$ selected in step SA03, and the reward $r_{t+1}$ calculated in step SA06 and then returns to step SA02.

Referring back to FIG. 5, the learning result storage section 26 stores a learning result of the movement-amount adjustment learning section 25. Further, when a learning result is used by the movement-amount adjustment learning section 25 again, the learning result storage section 26 outputs a stored learning result to the movement-amount adjustment learning section 25. As described above, a learning result may be stored in such a way that a value function corresponding to a machine learning algorithm to be used is stored in a supervised learning device such as a SVM and a neural network of an approximate function, an arrangement, or a multiple-value output, or the like.

Note that it is also possible for the learning result storage section 26 to receive and store a learning result stored in another machine tool 40 or the intensive management system 30, or possible for the learning result storage section 26 to output a learning result stored in the learning result storage section 26 to another machine tool 40 or the intensive management system 30.

The movement-amount output section 27 determines a movement amount of each axis based on a learning result of the movement-amount adjustment learning section 25 and current state data. Here, the determination of a movement amount of each axis corresponds to the "action a" used in the machine learning. As a method for determining movement amounts of respective axes, for example, the combination of movement amounts of respective axes in positive and negative directions (action 1: (X-axis movement amount, Z-axis movement amount)=(1, 0), action 2: (X-axis movement amount, Z-axis movement amount)=(2, 0), . . . , action n: (X-axis movement amount, Z-axis movement amount)=($\delta x_{max}$, $\delta z_{max}$)) may be prepared in advance as a selectable action, and an action by which a maximum reward will be obtained in the future based on a past learning result may be selected. In addition, an ε-greedy method described above may be employed to select a random action with a prescribed probability to advance learning.

After that, the movement-amount output section 27 outputs the determined movement amount of each axis to the numerical control section 2. Then, the numerical control section 2 drives each axis of the machine tool 1 based on the movement amount of each axis output from the movement-amount output section 27.

Then, the operation evaluation section 3 evaluates a driving result of each axis again, the machine learning device 20 acquires an evaluation result and a current situation of the machine tool 1, and learning is repeatedly performed using input state data. Thus, the acquisition of a more excellent learning result is allowed.

When an optimum acceleration/deceleration at each position on a command path is confirmed as a result of the learning of the machine learning device 20 as described above, the machine learning device 20 completes the learning. Data obtained by collecting a movement amount (command pulse) of each axis over a round of a tool path, which is output from the machine learning device 20 having completed the learning, is equivalent to movement data on a tool.

When the machine tool actually performs machining using learning data for which learning has been completed, the machine learning device 20 may perform a repetitive operation using the learning data for which the learning has been completed as it is so as not to perform new learning.

In addition, the machine learning device 20 that has completed learning (or the machine learning device 20 in which completed learning data on other machine learning devices 20 has been copied in the learning result storage section 26) may be attached to another machine tool 40 to perform a repetitive operation using the learning data for which the learning has been completed as it is.

Moreover, when the machine tool 1 is attached to another machine tool 40 in a state in which the learning function of the machine learning device 20 having completed learning is kept valid to continue the machining of a workpiece, it is also possible for the machine tool 1 to further learn an individual difference, a secular change, or the like different for each machine tool and perform an operation while searching for a better machining path for the machine tool.

Figure 7:
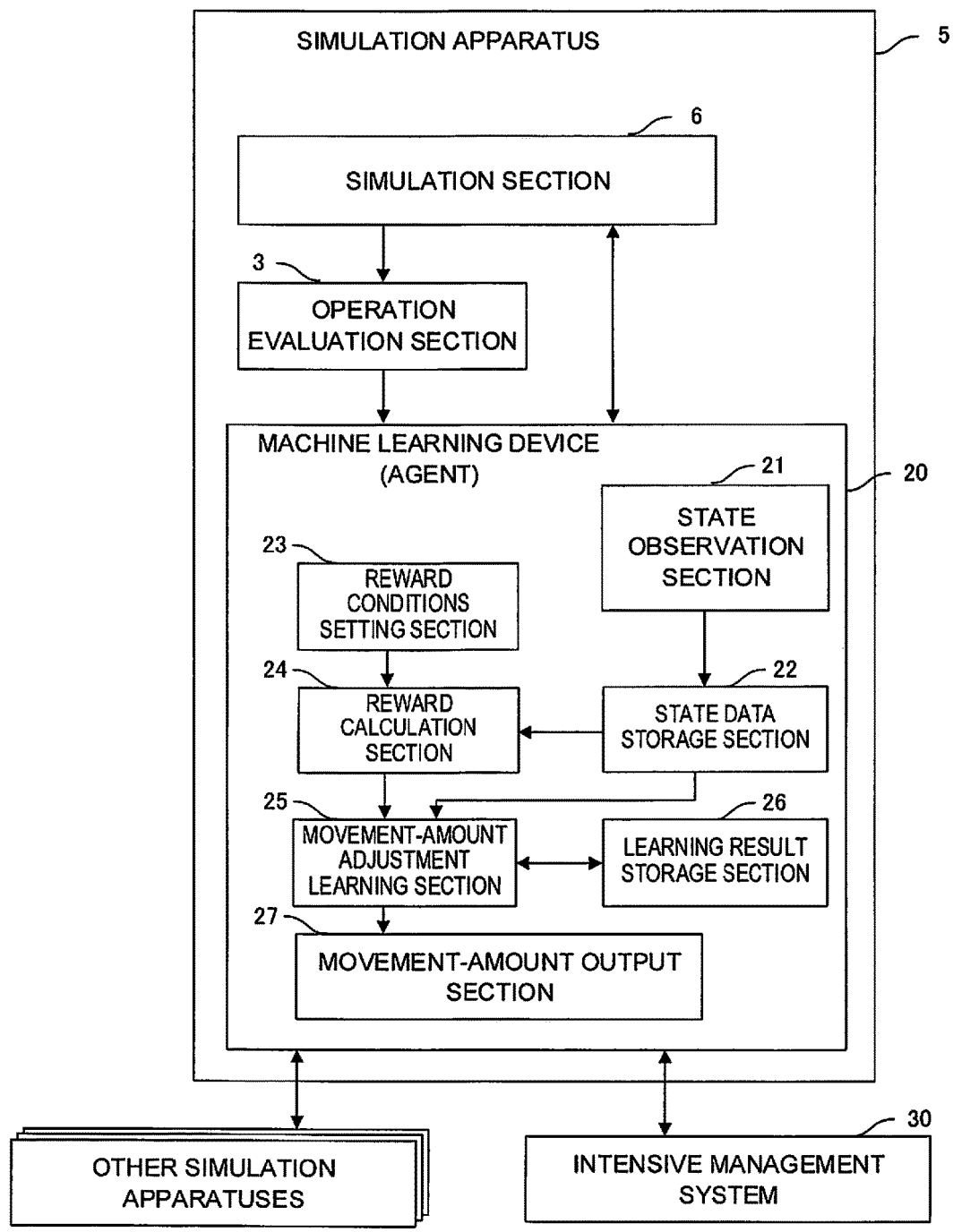
FIG. 7 is a function block diagram of a simulation apparatus according to an embodiment of the present invention.
Figure 8A:
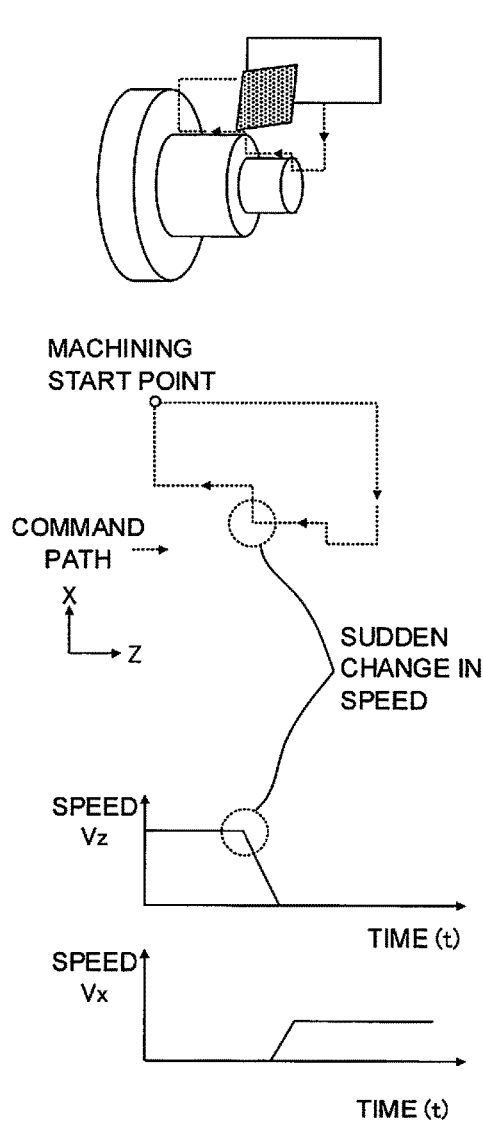
FIGS. 8A and 8B are diagrams for describing reduction in machining surface quality in the machining of a workpiece.
Figure 8B:
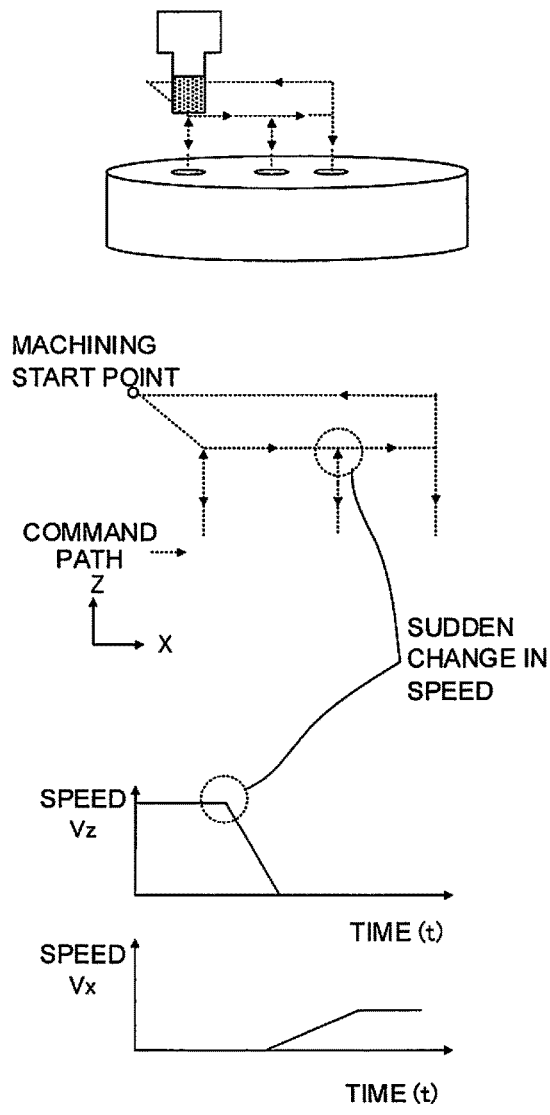

Note that when a learning operation is performed using the numerical control section 2 of the machine tool as described above, the numerical control section 2 may perform learning based on the virtual machining of a workpiece without actually operating the machine tool 1. In addition, as shown in FIG. 7, the machine learning device 20 may be incorporated into a simulation apparatus 4 provided with a simulation section 5 that separately simulates the operation of the machine tool to perform a learning operation based on a simulation result of the simulation section 5. In any case, since a movement amount causing a great deviation of a command path is likely to be output at the initial stage of the learning, it is desirable that a workpiece not be actually machined.

Further, the machine learning device 20 of the machine tool 1 may perform machine learning alone. However, when each of a plurality of machine tools 1 is further provided with a section used to communicate with an outside, it becomes possible to send/receive and share state data stored in each of the state data storage sections 22 and a learning result stored in each of the learning result storage sections 26. Thus, more efficient machine learning is allowed. For example, when learning is performed with a movement amount varied within a prescribed range, the learning is advanced in parallel between a plurality of machine tools 1 and 40 in such a way that state data and learning data are exchanged between the machine tools 1 while a workpiece is machined with different movement amounts varying within a prescribed range. Thus, efficient learning is allowed.

In order to exchange state data and learning data between a plurality of machine tools 1 and 40 as described above, communication may be performed via a host computer such as the intensive management system 30, the machine tools 1 and 40 may directly communicate with each other, or a cloud may be used. However, for handling large amounts of data, a communication section with a faster communication speed is preferably provided.

The embodiment of the present invention is described above. However, the present invention is not limited only to the example of the above embodiment and may be carried out in various aspects with appropriate modifications.

The invention claimed is:

1. A machine tool configured to drive at least one axis based on a command path of a tool commanded by a program to perform machining of a workpiece, the machine tool comprising:

an operation evaluation section configured to evaluate an operation of the machine tool to output evaluation data; and a machine learning device configured to perform machine learning of a determination of a movement amount of the axis, wherein the machine learning device includes a state observation section configured to acquire, as state data, data including at least a position of the axis of the machine tool and the evaluation data output from the operation evaluation section, a reward conditions setting section configured to set a reward condition, a reward calculation section configured to calculate a reward based on the state data acquired by the state observation section, a movement-amount adjustment learning section configured to perform the machine learning of the determination of the movement amount of the axis, and a movement-amount output section configured to determine the movement amount of the axis such that acceleration of the tool becomes optimum, based on (i) a machine learning result of the machine learning of the determination of the movement amount of the axis by the movement-amount adjustment learning section and (ii) the state data, and output the determined movement amount, and the movement-amount adjustment learning section is configured to perform the machine learning of the determination of the movement amount of the axis based on (i) the determined movement amount of the axis, (ii) the state data acquired by the state observation section after an operation of the machine tool based on the output movement amount of the axis, and (iii) the reward calculated by the reward calculation section.

2. The machine tool according to claim 1, wherein
the reward calculation section is configured to
calculate a positive reward when a combined speed of the axis is increased and
calculate a negative reward (i) when the tool deviates from the command path, (ii) when a change in an N-th order time differential element (where N is any natural number) of a speed of the tool is great, and (iii) when an impact occurs to the machine tool.

3. The machine tool according to claim 1, wherein
the machine tool is configured to be connected to at least one another machine tool and mutually exchange or share the machine learning result with the other machine tool.

4. The machine tool according to claim 1, wherein
the movement-amount adjustment learning section is configured to perform the machine learning, such that the reward be maximum, using (i) the adjusted movement amount of the axis and (ii) an evaluation function in which the state data acquired by the state observation section is expressed by an argument.

5. A simulation apparatus for simulating a machine tool configured to drive at least one axis based on a command path of a tool commanded by a program to perform machining of a workpiece, the simulation apparatus comprising:

an operation evaluation section configured to evaluate a simulation operation of the machine tool to output evaluation data; and a machine learning device configured to perform machine learning of a determination of a movement amount of the axis, wherein the machine learning device includes a state observation section configured to acquire, as state data, simulated data including at least a position of the axis of the machine tool and the evaluation data output from the operation evaluation section, a reward calculation section configured to calculate a reward based on the state data acquired by the state observation section, a movement-amount adjustment learning section configured to perform the machine learning of the determination of the movement amount of the axis, and a movement-amount output section configured to determine the movement amount of the axis such that an acceleration of the tool becomes optimum, based on (i) a machine learning result of the machining learning of the determination of the movement amount of the axis by the movement-amount adjustment learning section and (ii) the state data, and output the determined movement amount, and the movement-amount adjustment learning section is configured to perform the machine learning of the determination of the movement amount of the axis based on (i) the determined movement amount of the axis, (ii) the state data acquired by the state observation section after the simulation operation of the machine tool based on the output movement amount of the axis, and (iii) the reward calculated by the reward calculation section.

6. A machine learning device configured to perform machine learning of a determination of a movement amount of at least one axis of a machine tool, the machine learning device comprising:

a state observation section configured to acquire, as state data, data including at least a position of the axis of the machine tool;

a reward conditions setting section configured to set reward condition;

a reward calculation section configured to calculate a reward based on the state data acquired by the state observation section;

a movement-amount adjustment learning section configured to perform the machine learning of the determination of the movement amount of the axis; and a movement-amount output section configured to determine the movement amount of the axis such that acceleration of a tool moving by the axis becomes optimum, based on (i) a machine learning result of the machine learning of the determination of the movement amount of the axis by the movement-amount adjustment learning section and (ii) the state data, and output the determined movement amount, wherein the movement-amount adjustment learning section is configured to perform the machine learning of the determination of the movement amount of the axis based on (i) the determined movement amount of the axis, (ii) the state data acquired by the state observation section after an operation of the machine tool based on the output movement amount of the axis, and (iii) the reward calculated by the reward calculation section.

* * * * *